US007959768B2

(12) United States Patent
Porscha et al.

(10) Patent No.: US 7,959,768 B2
(45) Date of Patent: Jun. 14, 2011

(54) PARTIAL LOAD ENABLED FALLING FILM EVAPORATOR AND METHOD FOR OPERATING A PARTIAL LOAD

(75) Inventors: Peter Porscha, Kelkheim (DE); Michael Benje, Darmstadt (DE); Harald Hafenscher, Kelkeim (DE)

(73) Assignee: UHDE GmbH, Dortmund (DE)

( * ) Notice: Subject to any disclaimer, the term of this patent is extended or adjusted under 35 U.S.C. 154(b) by 366 days.

(21) Appl. No.: 11/662,461

(22) PCT Filed: Sep. 13, 2005

(86) PCT No.: PCT/EP2005/009806
§ 371 (c)(1),
(2), (4) Date: Oct. 9, 2007

(87) PCT Pub. No.: WO2006/029798
PCT Pub. Date: Mar. 23, 2006

(65) Prior Publication Data
US 2008/0196839 A1 Aug. 21, 2008

(30) Foreign Application Priority Data

Sep. 17, 2004 (DE) .......................... 10 2004 045 671

(51) Int. Cl.
*B01D 1/06* (2006.01)
*B01D 3/28* (2006.01)
*B01D 3/42* (2006.01)
(52) U.S. Cl. ....... 203/89; 159/13.2; 159/27.1; 159/27.3; 159/43.1; 159/49; 202/182; 202/236; 202/237; 202/262; 203/100; 203/DIG. 7

(58) Field of Classification Search ................. 159/13.2, 159/27.1, 27.3, 43.1, 49; 202/182, 236, 237, 202/262; 203/1, 89, 100, DIG. 7
See application file for complete search history.

(56) References Cited

U.S. PATENT DOCUMENTS

| 4,094,734 | A | | 6/1978 | Henderson et al. |
| 4,774,372 | A | | 9/1988 | Wachi et al. |
| 4,810,327 | A | * | 3/1989 | Norrmen ...................... 159/13.3 |
| 4,873,384 | A | | 10/1989 | Wachi et al. |
| 4,932,468 | A | * | 6/1990 | Ayub ............................ 165/118 |
| 5,004,043 | A | * | 4/1991 | Mucic et al. .................. 165/118 |
| 5,423,952 | A | * | 6/1995 | Stout ............................. 202/174 |
| 5,849,148 | A | * | 12/1998 | Walker ......................... 159/13.2 |
| 5,904,807 | A | * | 5/1999 | Ramm-Schmidt et al. .. 159/43.1 |
| 7,112,262 | B2 | * | 9/2006 | Bethge .......................... 202/172 |
| 7,182,840 | B1 | | 2/2007 | Benje et al. |
| 2004/0050503 | A1 | * | 3/2004 | Vallejo-Martinez et al. ... 159/22 |

FOREIGN PATENT DOCUMENTS

DE     36 04 968 A1     8/1986
(Continued)

*Primary Examiner* — Virginia Manoharan
(74) *Attorney, Agent, or Firm* — Marshall & Melhorn, LLC

(57) ABSTRACT

The invention relates to a falling film evaporator, which is fitted with a liquid distributor which is divided into segments, such that it is possible to charge only a limited number of evaporator tubes with liquid and the evaporator can be operated in an optimum manner even with a partial load. The invention also relates to a method for operating said falling film evaporator, the aim of which is to transfer heat, which is released when a gas-vapor mixture is condensed, to a liquid which is to be evaporated at least partially. It would be useful to use said falling film evaporator thus fitted in heat recuperation systems such as those used in the production of 1,2 dichloroethane.

7 Claims, 2 Drawing Sheets

FOREIGN PATENT DOCUMENTS

| | | |
|---|---|---|
| DE | 199 28 064 A1 | 12/2000 |
| EP | 0 100 263 A1 | 2/1984 |
| EP | 0 862 935 B1 | 9/1998 |
| EP | 1 228 022 B1 | 7/2002 |
| GB | 1 111 569 A | 5/1968 |
| SU | 1 084 033 A1 | 4/1984 |

* cited by examiner

PARTIAL LOAD ENABLED FALLING FILM EVAPORATOR AND METHOD FOR OPERATING A PARTIAL LOAD

BACKGROUND OF THE INVENTION

The invention relates to a falling film evaporator that features the following criteria:
  An external outer shell.
  A given number of tubes the internal side of which has a liquid film flowing downwards.
  Upper end devices for distributing the liquid to the individual tubes.
  Lower end devices for collecting the residual liquid and the vapour.
  A vapour extracting device for withdrawing the vapour forming inside the tubes.
  A device for withdrawing the non-evaporated portion of the liquid inside the tubes.
  Partitions that separate the internal chamber of the tubes and the hydraulic devices linked to the said chamber, for distributing and collecting the fluids from the space outside the tubes.
  A device for feeding the gas/vapour mixture to the chamber enclosing the external side of the tubes.
  A device for withdrawing the condensed liquid from the chamber enclosing the external side of the tubes.
  A device for discharging the condensed vapours and the condensable gases from the chamber enclosing the external side of the tubes.

The falling fill evaporator, therefore, is equipped with a header divided into segments in such a manner that the evaporator is also suitable for part-load operation. The invention is also related to a process suited for the operation of the said falling film evaporator and for transferring the heat released by the gas/vapour mixture during condensation and to be at least partly transferred to the liquid a portion of which evaporates during this cycle. Such a type of falling film evaporator operated in the mode described above is suitable for systems for heat recovery that are used, for example, in systems for the production of 1,2 dichloroethane (hereinafter referred to as EDC).

It is common knowledge that falling film evaporators permit a smooth heating of sensitive liquids. This is due to the high heat transfer coefficients of the inner side of the tube walls so that merely a small temperature difference is required between the outer wall side which as a rule is heated by a heating fluid and that of the liquid which forms a thin film on the inner side of the tube wall and evaporates. This feature, hence, also permits the utilisation of heating sources of lower value and the temperature level of which must only slightly exceed that of the liquid to be evaporated on the inner side of the tube wall.

This particularly applies if a higher heat transfer coefficient acts on the outer side of the tube wall because the heating fluid consists of condensable vapour. In this case the temperature difference between the heating fluid and the liquid to be evaporated may be as low as 3 K. In this context it is irrelevant what type of vapour is involved. Apart from water vapour, it is also possible to make use of vapours obtained in the course of the process, for instance, vapours from the distillation or chemically produced products withdrawn in the vaporous phase.

This is why falling film evaporators are becoming more and more profitable for heat recovery tasks in commercial scale plants. They are particularly suited for heating of the bottom of rectifying columns, such as in the EDC production outlined in EP 1 228 022 B1 and DE 36 04 968 A1.

In practical terms, however, falling film evaporators that are heated with a partly condensable fluid of a gas/vapour mixture exhibit the disadvantage of being inadequately suited for part-load operation. Whenever used as boiler for the rectification column bottom, this also encompasses poor controllability of the device as any reduction of the heat supply will inevitably lead to a temporary period of part-load operation because of the control action required on the evaporator. Difficulties are also encountered during start-up and shut-down operations.

The unfavourable properties encountered during part-load operation are due to the condensation behaviour of the heating fluid. During full-load operation the gas/vapour mixture is not hindered when entering the space enclosing the tubes via the controlled feeding device (hereinafter referred to as control valve) as the valve is in the 100% open position. The control action required for part-load operation of the evaporator entails a partial closure of the control valve and causes a pressure drop in the stream passing through the valve. The pressure drop thus obtained first leads to a partial pressure reduction of the heating vapours in the space outside the tubes and, consequently, to a reduction of the temperature governing the condensation of the liquid on the outer side of the tubes. In view of the very low temperature difference between the internal side and the outer side of the tubes, the evaporation temperature also decreases on the internal side, a phenomenon normally undesired because it will change the temperature conditions in the rectification column.

The second disadvantage is that the gas emerging from the gas/vapour mixture can be removed from the falling film evaporator with great difficulties only, i.e. if there is sufficient residual pressure. Depending on the upstream pressure and the pressure loss caused by the control valve it is necessary to deploy a vacuum pump for removing the gas. If the complete vapour cannot condense the vacuum pump must also withdraw the vapour portions.

A further problem arises if the gas emerging from the gas/vapour mixture develops in an explosive range. This particularly applies in the case of total condensation of the vapour. For example, when using a gas/vapour mixture from ethylene, oxygen and EDC, the said EDC being the major portion of the condensable component and with oxygen and ethylene prone to form an explosive mixture, the above-mentioned problem will occur during the condensation process. In this case it is therefore required to prevent with absolute security a total condensation of the EDC vapours.

The said problems are not only of a static nature but they also depend on the velocity of the control action taken. As a rule, quick-acting control actions are considerably more difficult to be stabilised than slow-acting control operations. Falling film evaporators of the conventional type and operational mode are particularly sensitive in this respect.

BRIEF SUMMARY OF THE INVENTION

The aim of the invention therefore is to overcome the said disadvantages and to provide a falling film evaporator and process well suited for part-load operation.

DETAILED DESCRIPTION OF THE INVENTION

Figure 1:
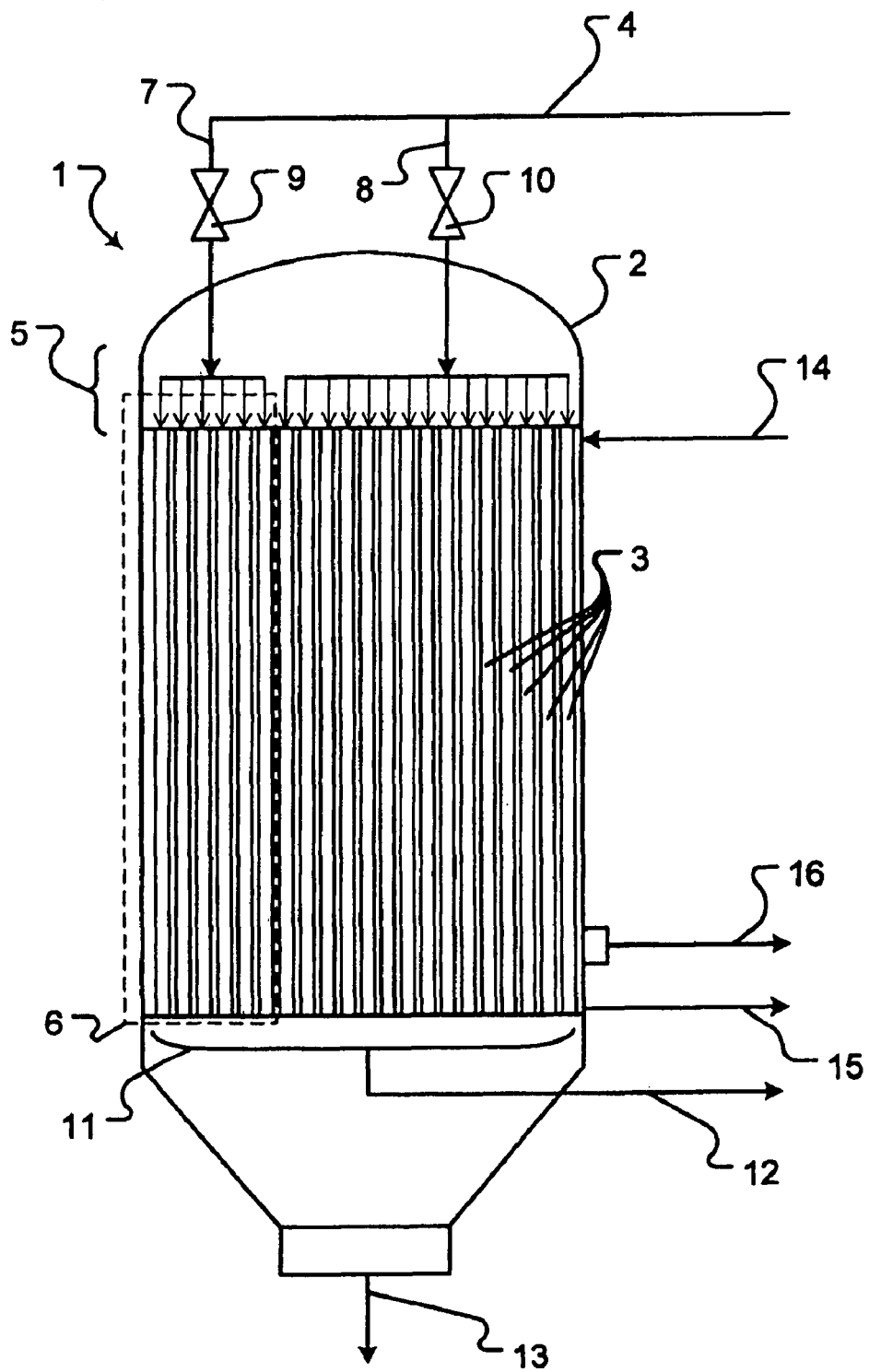
FIG. 1 shows an embodiment of a falling film evaporator.

The aim of the invention is achieved by a partial load enabled falling film evaporator with an external outer shell. The device includes a number of tubes, the internal side of which has a liquid film flowing downwards, comprising an internal chamber. Upper end devices for distributing the liquid to the individual tubes are also included, as are lower end devices for collecting residual liquid and vapor. A vapor extracting device for withdrawing the vapor forming inside the tubes and a device for withdrawing the non-evaporated portion of the liquid inside the tubes are also provided. Hydraulic devices are linked to the internal chamber of the tubes. Partitions are provided that separate the internal chamber of the tubes and the hydraulic devices for distributing and collecting fluids from the space enclosing the tubes. A device for feeding a mixture of the gas and vapor to a chamber enclosing the external side of the tubes is provided, along with a device for withdrawing condensed liquid from the chamber enclosing the external side of the tubes. A header for distributing liquid to be evaporated and a device for discharging the vapors and the gases from the chamber enclosing the external side of the tubes, are also provided. The header distributes the liquid to be evaporated among the individual internal sides of the tubes and is partitioned in at least two segments, with means for feeding each of these segments with liquid or omitting them from the liquid feed.

A preferred embodiment of this device provides for segments of different size so that each segment is designed to feed a different number of tubes with liquid. It is recommended to arrange the partition in such a manner that the size ratio of a smaller segment and the next larger segment amounts to 1:4 up to 2:3, in an ideal version 1:2, with reference to the number of tubes to be fed with liquid.

Hence, the implementation of two segments provides for a rating of 20 to 40% of the tubes to be fed with liquid, ideally 33%. When three partitioned segments are used, the smallest segment should feed 4.8 to 21%, ideally 14% of the tubes, the central segment 19 to 32%, ideally 28%, and the largest segment between 47 and 76%, ideally 57%.

The arrangement of the said segments as well as their geometry play no role. Such segments may, for instance, consist of concentric circles, cake-shaped sectors or segments of a circle and any other geometrical arrangement is feasible. In view of the small temperature difference between the liquid to be evaporated and the vaporous heating medium, it is obvious that critical thermal stress must not be expected, such as in the case of heat exchangers that are under angular load, which may cause mechanical problems.

The process required to operate the unit features an individual interruption of the liquid feed to the respective segments of the header system depending on the desired part-load mode. The volume of liquid contained in the header segments, therefore, governs the quick-acting control performed at one-minute intervals over a very wide range of operation. Since the number of tubes loaded with liquid on the inside is in fact reduced, the actual surface area of heat transfer is considerably smaller. A precision control is effected with the aid of the rate of liquid fed to the header segments that are still supplied with liquid.

Hence, it is no longer necessary to utilise the control valve installed for the gas/vapour mixture in order to perform the regulation of the heat quantity to be transferred by the falling film evaporator. The said control valve can now be deployed for the new function of assisting—via the pressure loss regulation—in the precision control of the temperature required for the boiler in the column bottom, of course within the range described above.

If such a control of the temperature in the boiler of the column bottom is not needed the standard control valve may be replaced by a simple shut-off valve with extremely low pressure loss, which constitutes a further advantage of the invention.

As the complete configuration in this particular case ensures an extremely low degree of pressure loss, it is in fact possible to re-compress, after the condensation cycle, the residual gas/vapour mixture to the initial pressure, and that with a small input of expenditure. Moreover, this concept also permits the use of heating sources which only require a part stream to be withdrawn and which allow the residual gas/vapour mixture to be admixed again; this constitutes a further advantage of the invention.

An advantageous embodiment of the unit in accordance with the invention provides for a device for withdrawing the vapour formed on the internal side of the tubes and removing the non-condensable gases from the central pipe which is formed by an entry opening pointing to the lower side and a vertical section communicating with the former. In an ideal version the diameter of the said pipe equals or exceeds the total of the internal free cross sections of flow of all evaporator tubes so that an entraining of fluid particles is avoided to a very large extent.

Figure 2:
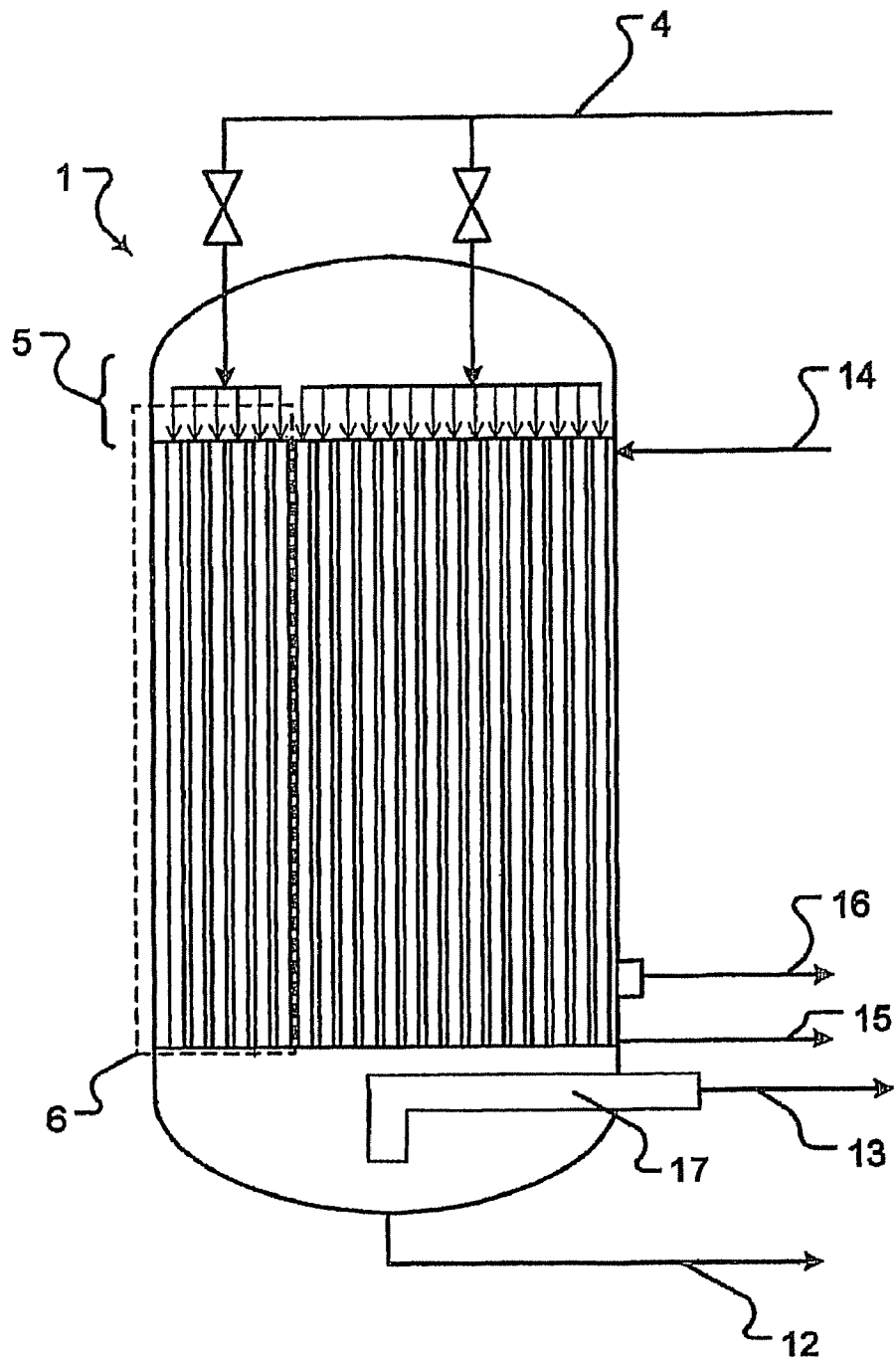
FIG. 2 shows another embodiment of a falling film evaporator.

The invention is illustrated by the examples shown in FIG. 1 and FIG. 2. FIG. 1 shows falling film evaporator 1 which consists of outer shell 2 and a multitude of tubes 3 fixed at both ends in tube sheets not specified in detail. The liquid fed to tubes 3 is piped via line 4 of header 5 mounted on the upper end and distributed to two tube segments, the smaller tube segment 6 being framed by a dashed line. Line 4 is analogously partitioned in lines 7 and 8 in accordance with the header, each of lines 7 and 8 being equipped with valve 9 or 10, respectively, such that the segments of header 6 can be separated fluid-dynamically.

Collecting tray 11 arranged underneath tubes 3 and intended for catching the residual liquid coming from tubes 3 and to be removed from falling film evaporator 1 via line 12. The vapour and gases that have flown through tubes 3 or formed therein are removed from the said evaporator via line 13.

Line 14 is used to feed a gas/vapour mixture to the space enclosing the external side of the tubes. The condensate that forms therein is discharged via line 15 while the non-condensed vapours or non-condensed gases, respectively, leave the said outer space and evaporator 1 via line 16.

FIG. 2 shows a typical evaporator designed such that the liquid coming from the space inside the tubes is collected in the bottom of falling film evaporator 1 and discharged via line 12. Vapour and non-condensed gases leaving the inner space of the tubes are discharged via a central pipe 17 that has an opening pointing towards the lower side and a vertical section communicating with the former, the diameter of said pipe being sufficiently large to avoid the entraining of liquid particles by the gas stream. The horizontal section of central pipe 17 and line 13 are used to withdraw the vapour and gases from the falling film evaporator.

According to a simple but not specifically shown variant, the liquid coming from tubes 3 and the vapour that is present in the bottom section of falling film evaporator 1 can be collected and discharged via a common line 12.

The invention claimed is:

1. A partial load enabled falling film evaporator comprising:
    an external outer shell;
    a number of tubes the internal side of which has a liquid film flowing downwards, the tubes comprising an internal chamber;
    upper end devices for distributing the liquid to the individual tubes;
    lower end devices for collecting residual liquid and vapor;
    a vapor extracting device for withdrawing the vapor forming inside the tubes;
    a device for withdrawing the non-evaporated portion of the liquid inside the tubes;
    devices linked to the internal chamber of the tubes;
    partitions that separate the internal chamber of the tubes and the devices 9, 10, 11, 12, 13 and 17, linked to said chamber, for distributing and collecting fluids from the space enclosing the tubes;
    a device for feeding a mixture of the gases and vapors to a chamber enclosing the external side of the tubes;
    a device for withdrawing condensed liquid from the chamber enclosing the external side of the tubes;
    a header for distributing liquid to be evaporated; and
    a device for discharging the vapors and the gases from the chamber enclosing the external side of the tubes, wherein
    the header distributes the liquid to be evaporated among the individual internal sides of the tubes and is partitioned in at least two segments, and means for feeding or omitting each of these segments with liquid.

2. The falling film evaporator according to claim 1, wherein the upper end devices comprise segments of different size so that each segment is designed to feed a different number of tubes with liquid.

3. The falling film evaporator according to claim 2, wherein the partition is arranged in such a manner that the size ratio of the smaller segment and the next larger segment is 1:4 up to 2:3, with reference to the number of tubes to be fed with liquid.

4. A falling film evaporator according to claim 3, wherein the partition is arranged in such a manner that the size ratio of the smaller segment and the next larger segment is about 1:2.

5. The falling film evaporator according to claim 1, wherein the device for withdrawing the vapor formed on the internal side of the tubes and the device for withdrawing the non-condensable gases from a pipe comprises a single unit which is formed by an entry opening pointing to the lower side and a vertical section communicating with the former.

6. The falling film evaporator according to claim 5, wherein the diameter of said pipe equals or exceeds the total of the internal free cross sections of flow of all evaporator tubes.

7. A process required to operate the falling film evaporator according to claim 1, wherein a partial load is desired, comprising individually interrupting the liquid feed to the respective segments of the header depending on the desired part-load mode.

\* \* \* \* \*